(12) United States Patent
Yang et al.

(10) Patent No.: US 7,551,735 B2
(45) Date of Patent: Jun. 23, 2009

(54) HOUSING FOR AN ELECTRONIC DEVICE, AND METHOD FOR MAKING THE SAME

(75) Inventors: Qing Yang, Shenzhen (CN); Chia-Hua Chen, Tu-Cheng (TW)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 510 days.

(21) Appl. No.: 11/397,016

(22) Filed: Apr. 3, 2006

(65) Prior Publication Data

US 2007/0036351 A1 Feb. 15, 2007

(30) Foreign Application Priority Data

Jun. 3, 2005 (CN) .................... 2005 1 0035126

(51) Int. Cl.
*H04M 1/00* (2006.01)
*H04M 9/00* (2006.01)
(52) U.S. Cl. .................... 379/433.01; 379/433.07; 455/575.1
(58) Field of Classification Search ............ 379/433.01, 379/433.06, 433.07, 440, 437, 447, 451; 455/575.1, 575.8, 90.3
See application file for complete search history.

(56) References Cited

U.S. PATENT DOCUMENTS

| 5,768,370 | A * | 6/1998 | Maatta et al. | 379/433.01 |
| 7,003,105 | B2 * | 2/2006 | Gledhill | 379/449 |
| 2002/0172354 | A1 * | 11/2002 | Nishi | 379/433.07 |
| 2003/0068035 | A1 * | 4/2003 | Pirila et al. | 379/447 |

* cited by examiner

*Primary Examiner*—Tuan D Nguyen
(74) *Attorney, Agent, or Firm*—Steven M. Reiss

(57) ABSTRACT

A housing (100) for an electronic device includes a cover (10) and an elastic keypad (12). The cover includes a plurality of keypad openings (102) defined therein. The elastic keypad is integrally formed with the cover. The elastic keypad includes a plurality of keys (120) formed on a front surface thereof, and a plurality of protrusions (126) formed on a back surface thereof. Each of the protrusions aligns with a corresponding one of the keys, received in a corresponding one of the keypad openings. The elastic keypad comprising a contactor (122) attached to each of the protrusions. The present invention also provides a method for making the housing.

10 Claims, 6 Drawing Sheets

HOUSING FOR AN ELECTRONIC DEVICE, AND METHOD FOR MAKING THE SAME

BACKGROUND OF THE INVENTION

1. Field of the Invention

The present invention generally relates to electronic devices and, more particularly, to a housing for an electronic device and to a method for making the housing.

2. Discussion of the Related Art

With the development of wireless communication and information processing technologies, portable electronic devices such as notebook computers, mobile phones, and personal digital assistants (PDAs) are now in widespread use. These electronic devices enable consumers to enjoy high technology services anytime and anywhere.

In some mobile phones, a front cover and a keypad are separately installed in a main body. Referring to FIG. 6, one of such mobile phone 2 includes a front cover 20, a keypad 24, and a main body 22. Several key openings 21 for the keypad 24 to pass through are formed in the front cover 20. Accordingly, several keypad contactors 28 are set in the main body 22, connecting to a PCB (printed circuit board). In assembly, the keypad 24 and the front cover 20 are, in that order, installed onto the main body 22.

For assembly, the key openings 21 are often a little bigger than the keys of the keypad 24. Therefore, there is a gap between the key opening 21 and the key of the keypad 24. Therefore, it can be seen that the mobile phone 2 with such a mechanism will suffer from dust contamination or damp corrosion, where dust or damp often enters into the interior of the mobile phone 2 from the gap between the key opening 21 and the key of the keypad. Furthermore, the front cover 20 and the keypad 24 are made by two separate processes, which prolong the cycle time of production of the mobile phone 2.

Therefore, a housing for an electronic device, which has a more hermetically sealed mechanism, is desired.

SUMMARY OF THE INVENTION

In one aspect, a housing for an electronic device includes a cover and an elastic keypad. The cover includes a plurality of keypad openings defined therein. The elastic keypad is integrally formed with the cover. The elastic keypad includes a plurality of keys formed on a front surface thereof, and a plurality of protrusions formed on a back surface thereof. Each of the protrusions aligns with a corresponding one of the keys, received in a corresponding one of the keypad openings. The elastic keypad comprising a contactor attached to each of the protrusions.

In another aspect, a method for making a housing for a portable electronic device includes the steps of: providing a cover, the cover includes a plurality of keypad openings; and integrally forming an elastic keypad on the cover, the keypad includes a plurality of keys and contactors, the keys are orientated to the front surface of the cover, and the contactors are orientated towards the back surface of the cover.

Other advantages and novel features will become more apparent from the following detailed description when taken in conjunction with the accompanying drawings.

BRIEF DESCRIPTION OF THE DRAWINGS

Many aspects of the housing can be better understood with reference to the following drawings. The components in the drawings are not necessarily drawn to scale, the emphasis instead being placed upon clearly illustrating the principles of the present housing. Moreover, in the drawings, like reference numerals designate corresponding parts throughout the several views.

DETAILED DESCRIPTION OF THE EMBODIMENTS

Figure 1:
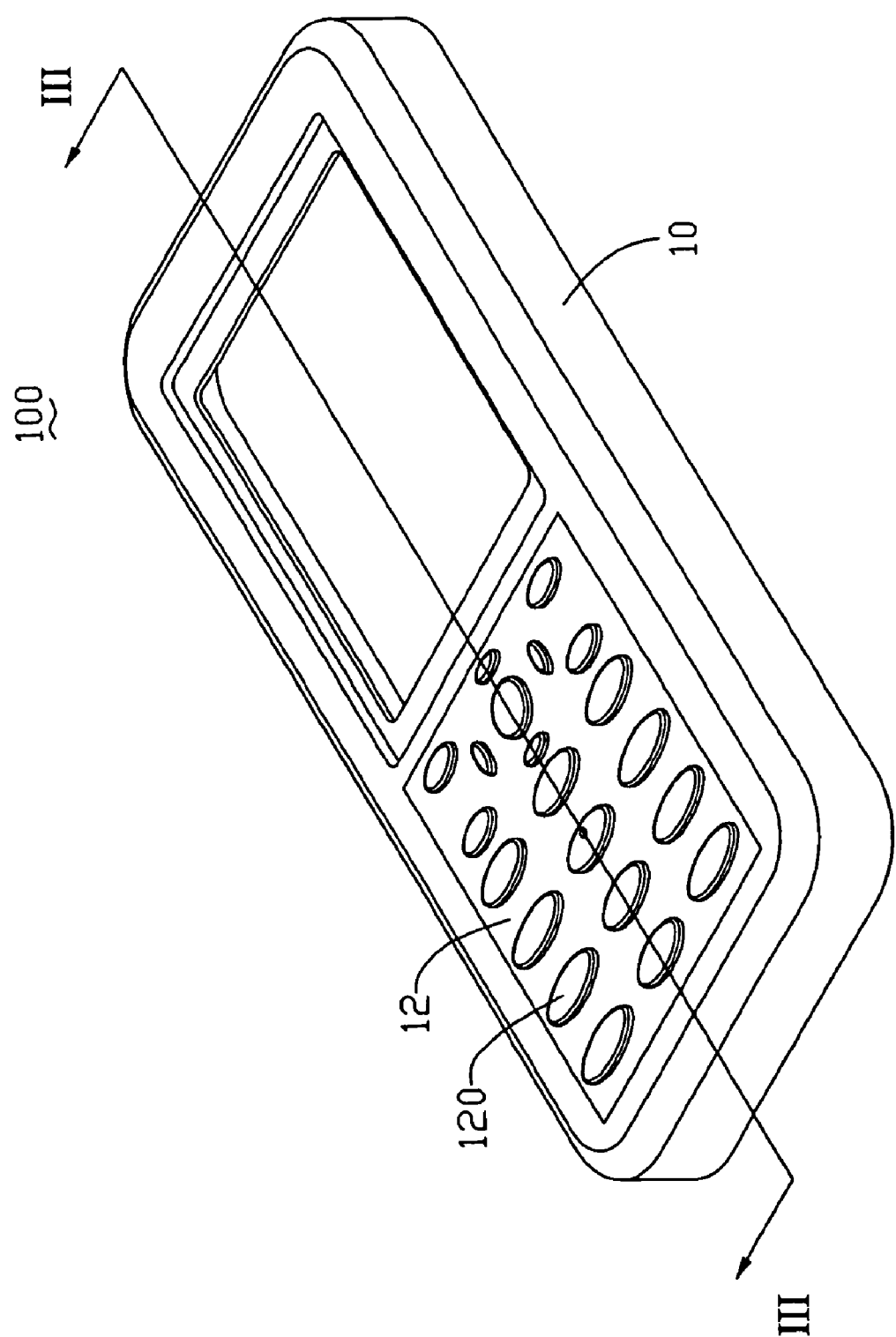
FIG. 1 is a schematic view of a housing in accordance with a preferred embodiment.
Figure 2:
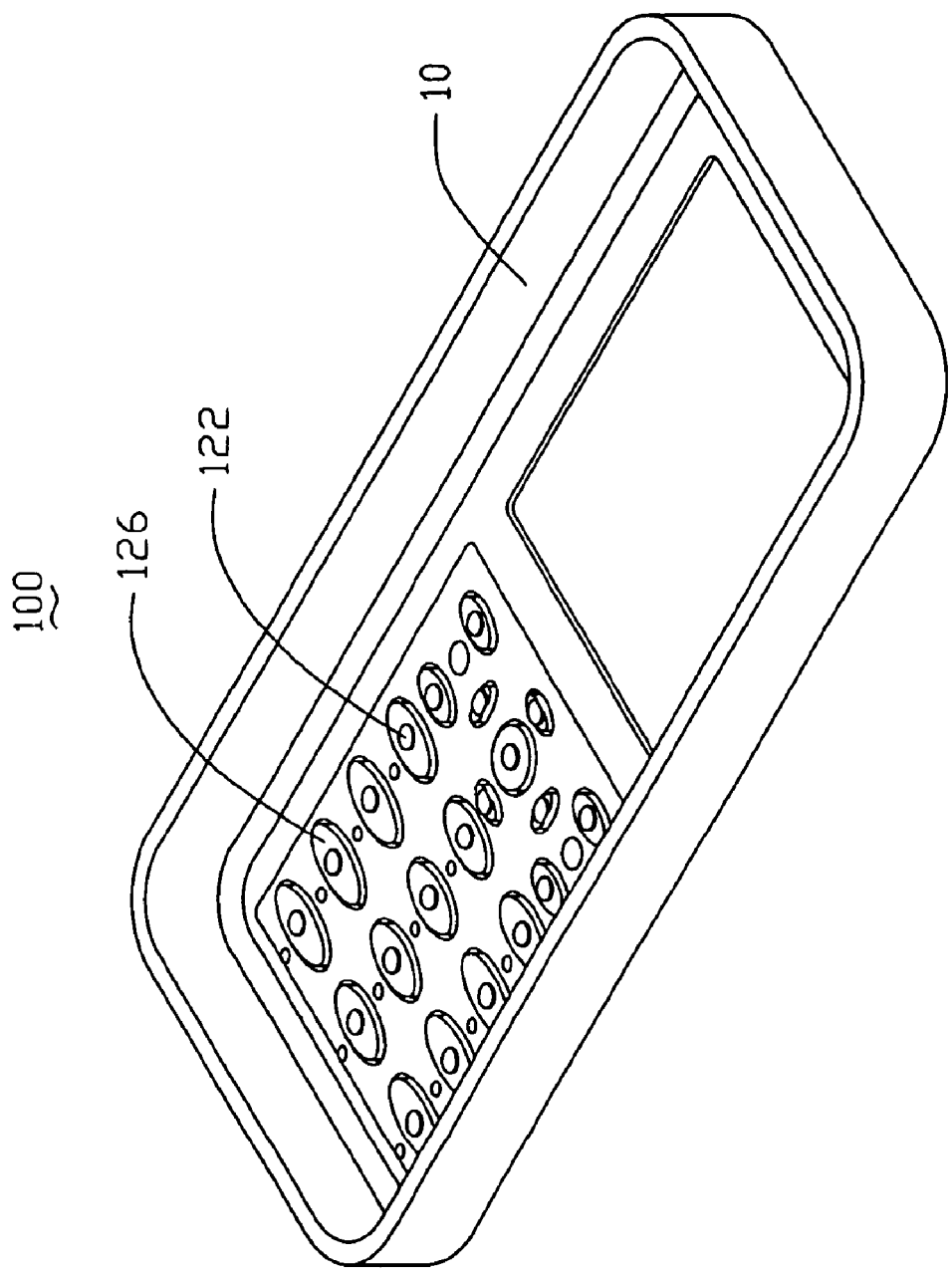
FIG. 2 is similar to FIG. 1, but viewed from another aspect.
Figure 3:
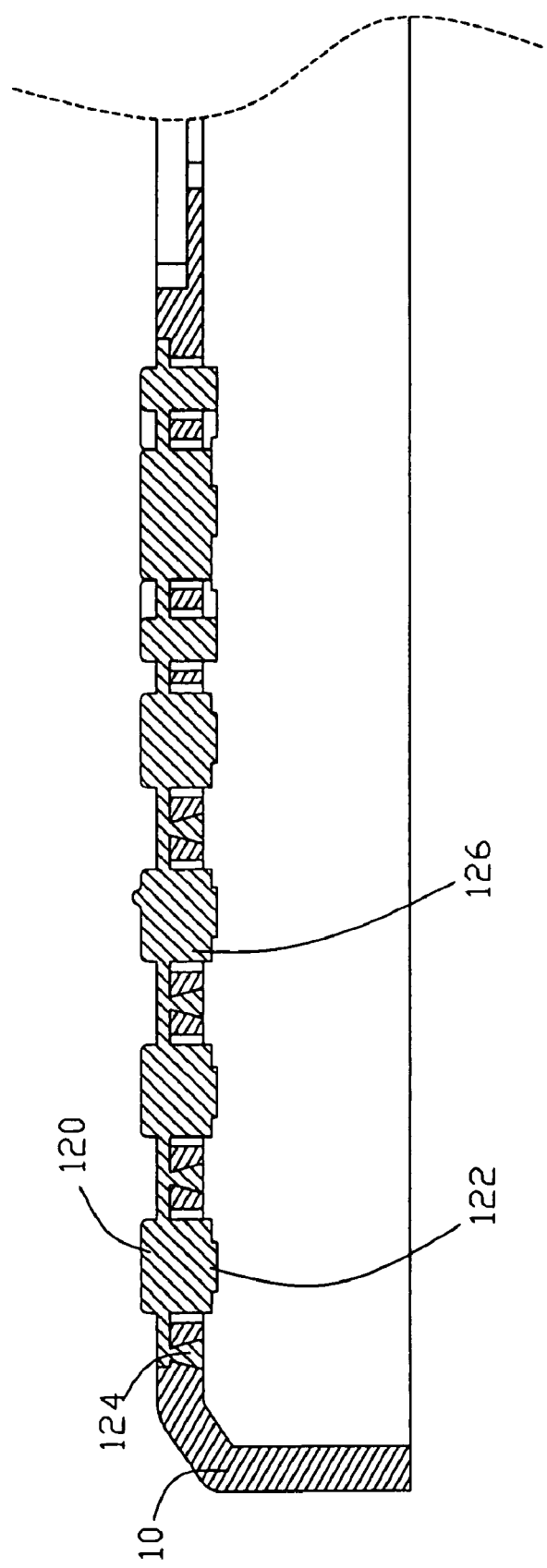
FIG. 3 is an enlarged, cross-sectional view of the housing along line III-III in FIG. 1.
Figure 4:
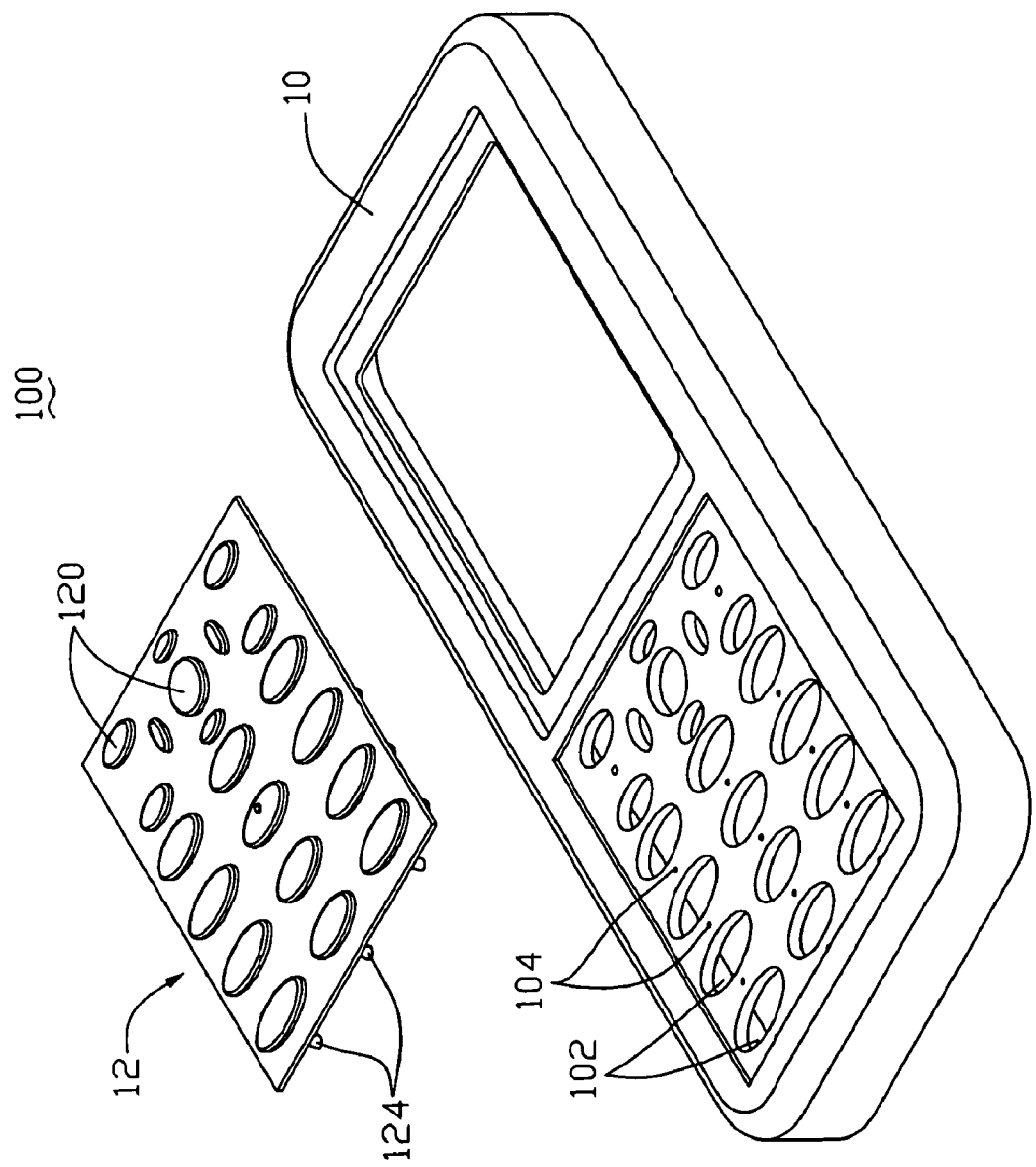
FIG. 4 is an exploded, schematic view of the housing in FIG. 1.
Figure 5:
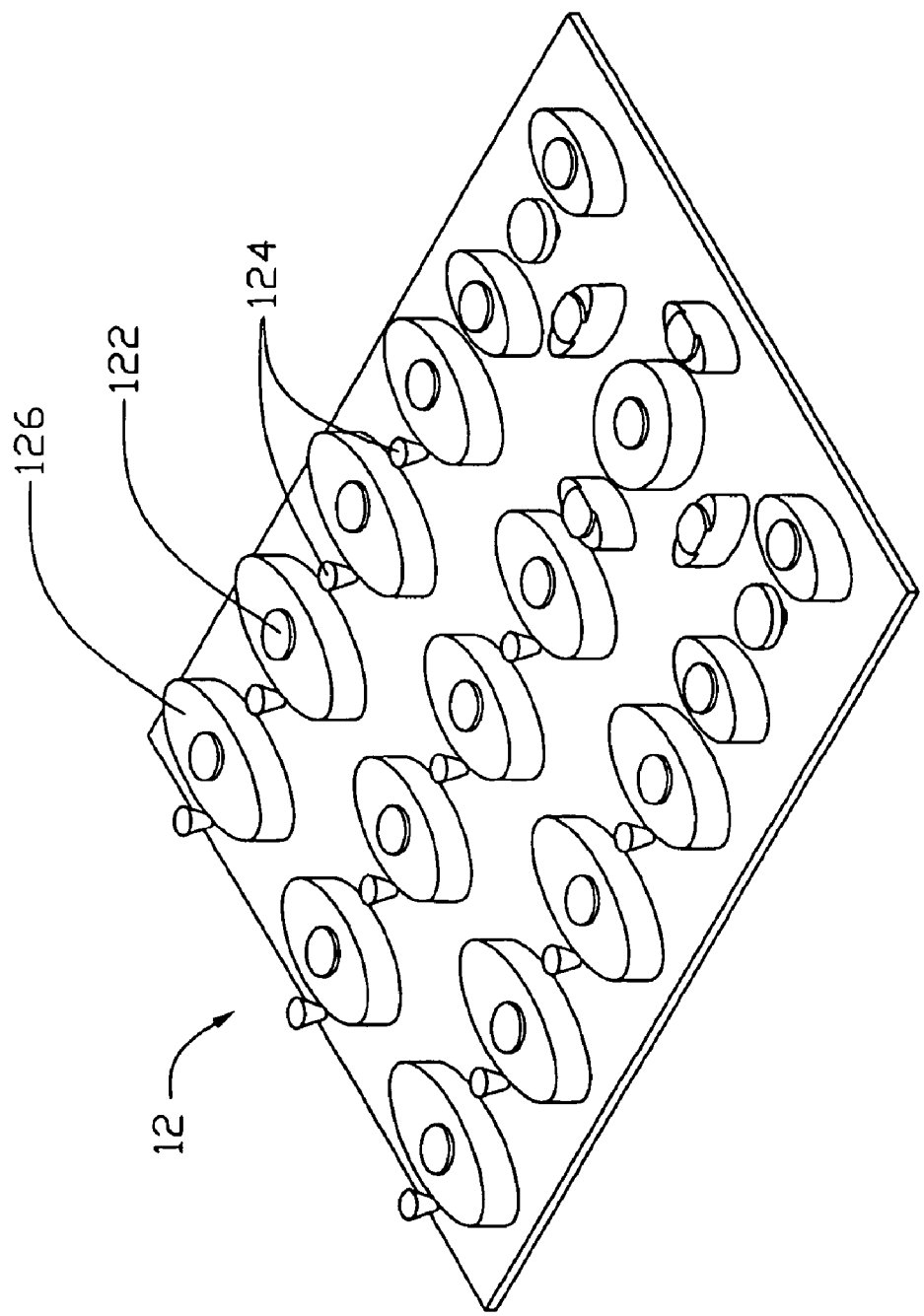
FIG. 5 is a schematic view of the keypad of the housing in FIG. 1.
Figure 6:
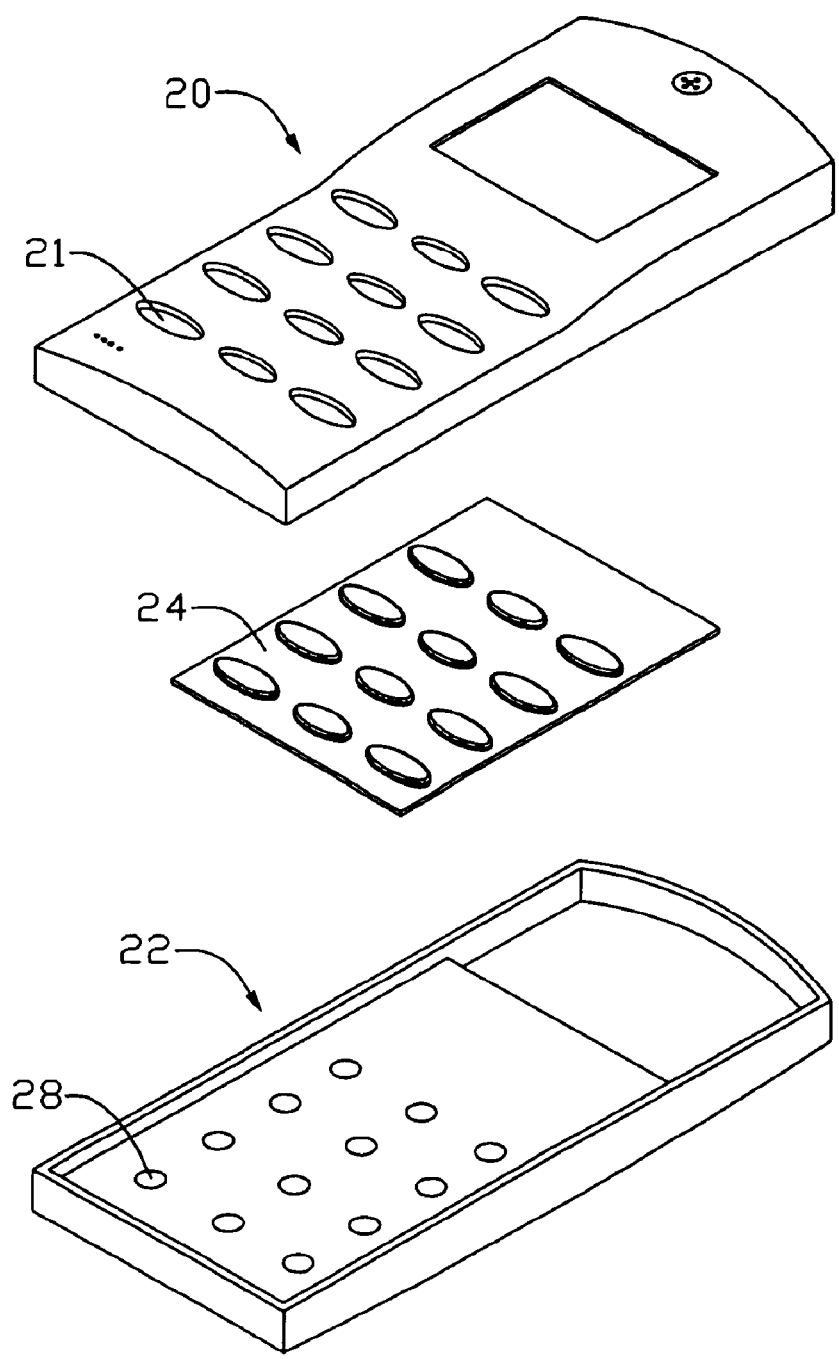
FIG. 6 is an exploded, isometric view of a mobile phone mechanism of the prior art.

Referring to FIGS. 1-5, in a preferred embodiment, a housing 100 includes a front cover 10 and an elastic keypad 12 integrally formed on the front cover 10. For describing the structure of housing 100, FIG. 4 shows an exploded view of the housing 100, though the front cover 10 and the elastic keypad 12 are actually formed together. The front cover 10 includes a plurality of keypad openings 102. The elastic keypad 12 includes a plurality of keys 120 and contactors 122.

The keys 120 are formed on the front surface of the elastic keypad 12, and the contactors 122 are formed on the back surface of the elastic keypad 12, connecting with the keys 120 with a plurality of protrusions 126. The elastic keypad 12 is formed on the front cover 10 with the protrusions 126 traveling through the keypad openings 102. A gap locates between each key protrusion 126 and keypad opening 102, which make the keys 120 easily to be pushed when the housing 100 is in use. The front cover 10 further includes a plurality of locking holes 104 formed around the keypad openings 102. The locking holes 104 each have diameters which gradually increase in size from the front surface to the back surface of the front cover 10. The elastic keypad 12 has a plurality of projections 124 to formed in the locking holes 104 of the front cover 10. in mold. so that the elastic keypad 12 is firmly fixed to the front cover 10.

The front cover 10 is, preferably, made of a plastic material. The plastic material can be polyvinyl chloride, polyethylene terephthalate, acrylonitrile-butadiene-styrene, polycarbonate, polyimide, liquid crystal polymer, polyetherimide, polyphenylene sulfide, polysulfone, polystyrene, glycol-modified polyester, polypropylene, or any desired combination thereof. The elastic keypad 12 is, preferably, made of an elastic thermoplastic plastic, such as thermoplastic urethanes (TPU).

Referring to FIGS. 1-4, an exemplary method for making the housing 100 includes steps of: molding a front cover 10 in a first mold by injection molding, the front cover 10 defining plurality of keypad openings 102 and locking holes 104; transferring the front cover 10 to a second mold; injecting material on the front cover 10 in the second mold to form an elastic keypad 12. The keypad 12 includes a plurality of keys 120 and contactors 122. The keys 120 are orientated towards the front surface of the front cover 10, and the contactors 122 are orientated towards the back surface of the front cover 10. Thereby, a housing 100 for a portable electronic device is obtained.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A housing for portable communication device, comprising: a cover having a plurality of keypad openings defined therein; and an elastic keypad integrally formed with the cover in-mold, the elastic keypad comprising a plurality of keys formed on a front surface thereof, and a plurality of protrusions formed on a back surface thereof, each of the protrusions aligning with a corresponding one of the keys and received in a corresponding one of the keypad openings, the elastic keypad comprising a contactor attached to each of the protrusions; wherein the cover further comprises a plurality of locking holes, the elastic keypad further comprises a plurality of projections formed in the locking holes; and wherein the locking holes have diameters which gradually increase from front surface to back surface of the cover, and the projections respectively fill in the locking holes.

2. The housing as claimed in claim 1, wherein the cover is made of a material selected from the group consisting of polyvinyl chloride, polyethylene terephthalate, acrylonitrile-butadiene-styrene, polycarbonate, polyimide, liquid crystal polymer, polyetherimide, polyphenylene sulfide, polysulfone, polystyrene, glycol-modified polyester, and polypropylene.

3. The housing as claimed in claim 1, wherein the elastic keypad is made of thermoplastic urethanes (TPU).

4. A method for making a housing for a portable communication device, comprising the steps of: molding a cover in a first mold, the cover defining having a plurality of keypad openings; transferring the cover to a second mold; and injecting material on the cover in the second mold to form an elastic keypad, the elastic keypad traveling through the keypad openings, wherein the keypad comprises a plurality of keys and contactors, the keys oriented toward the front surface of the cover, and the contactors are oriented towards the back surface of the cover; wherein the cover defines a plurality of locking holes and the elastic keypad further comprises a plurality of projections, the projection formed by injecting material in the locking holes and wherein the locking holes have diameters which gradually increase from the front surface to back surface of the cover and the projections respectively fill in the locking holes.

5. The method as claimed in claim 4, wherein the cover is made of a material selected from the group consisting of polyvinyl chloride, polyethylene terephthalate, acrylonitrile-butadiene-styrene, polycarbonate, polyimide, liquid crystal polymer, polyetherimide, polyphenylene sulfide, polysulfone, polystyrene, glycol-modified polyester, and polypropylene.

6. The method as claimed in claim 5, wherein the cover is molded by injection molding.

7. The method as claimed in claim 4, wherein the elastic keypad is made of thermoplastic urethanes (TPU).

8. The method as claimed in claim 7, wherein the elastic keypad comprises a plurality of keys and contactors. the keys are orientated towards the front surface of the cover, and the contactors are orientated towards the back surface of the cover.

9. A housing for portable communication device, the housing comprising: a cover, defining a plurality of keypad openings an elastic keypad, integrally formed on the cover in-mold, the elastic keypad having a keypad front surface and a keypad back surface, the keypad including a plurality of contactors attached to the keypad back surface, each of the contactors aligning with a corresponding one of the keypad openings, the keypad including a plurality of keys integrally extending outward from the keypad front surface, each of the keys aligning with a corresponding one of the contactors; wherein the cover defines a plurality of locking holes and the elastic keypad further comprises a plurality of projections, the projection formed by injecting material in the locking holes and wherein the locking holes have diameters which gradually increase from the front surface to back surface of the cover and the projections respectively fill in the locking holes.

10. The housing of claim 9, wherein the keypad comprises a protrusion integrally extending outward from the keypad back surface, each of which is received in a corresponding one of the keypad openings, and the contactors are attached to the protrusions.

* * * * *